United States Patent [19]

Tsubaki et al.

[11] 3,943,893

[45] Mar. 16, 1976

[54] FLUID COUPLING FOR AN INTERNAL COMBUSTION ENGINE

[75] Inventors: Yousuke Tsubaki; Tamio Nakakubo, both of Toyota, Japan

[73] Assignee: Toyota Jidosha Kogyo Kabushiki Kaisha, Toyota, Japan

[22] Filed: Aug. 28, 1974

[21] Appl. No.: 501,300

[30] Foreign Application Priority Data
Apr. 30, 1974 Japan.............................. 49-47623

[52] U.S. Cl. ....... 123/41.12; 123/41.11; 123/41.65; 192/58 B
[51] Int. Cl.² ............................................ F01P 7/02
[58] Field of Search........... 123/41.11, 41.12, 41.65; 64/26; 192/58 B, 82 T, 103 C

[56] References Cited
UNITED STATES PATENTS

| | | | |
|---|---|---|---|
| 3,159,254 | 12/1964 | Weir.................................. | 192/58 B |
| 3,648,811 | 3/1972 | LaFlame .......................... | 192/58 B |
| 3,690,428 | 9/1972 | LaFlame .......................... | 192/58 B |
| 3,840,101 | 10/1974 | Peter................................. | 192/58 B |

*Primary Examiner*—Charles J. Myhre
*Assistant Examiner*—Daniel J. O'Connor
*Attorney, Agent, or Firm*—Lane, Aitken, Dunner & Ziems

[57] ABSTRACT

A coupling assembly for operatively connecting an output shaft of an internal combustion engine to a member associated with the engine such as a cooling fan, in which a rotor is fixed to the output shaft and a first casing is fixed relative to the member associated with the engine and surrounds the rotor. A first reservoir is defined within the first casing and contains a coupling fluid for transferring the torque of the rotor to the casing. A second casing is fixed to the first casing and defines a second reservoir for the fluid, with the second casing having a plurality of openings formed therethrough for permitting the fluid to pass from the first reservoir to the second reservoir to reduce the amount of torque transferred from the rotor to the first casing. An inertia valve is responsive to angular acceleration of the rotor and selectively controls the amount of fluid passing through the openings and thus the amount of torque transferred.

4 Claims, 5 Drawing Figures

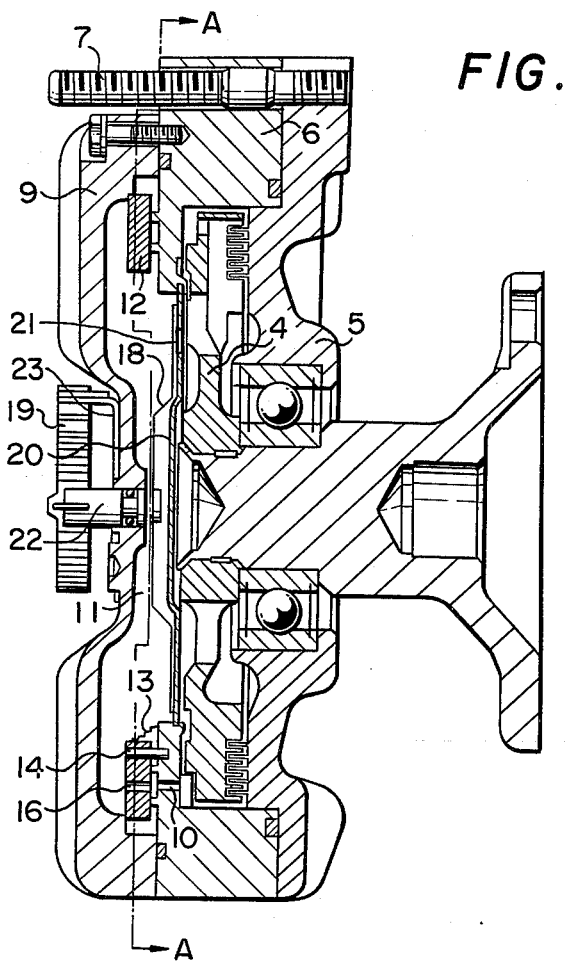
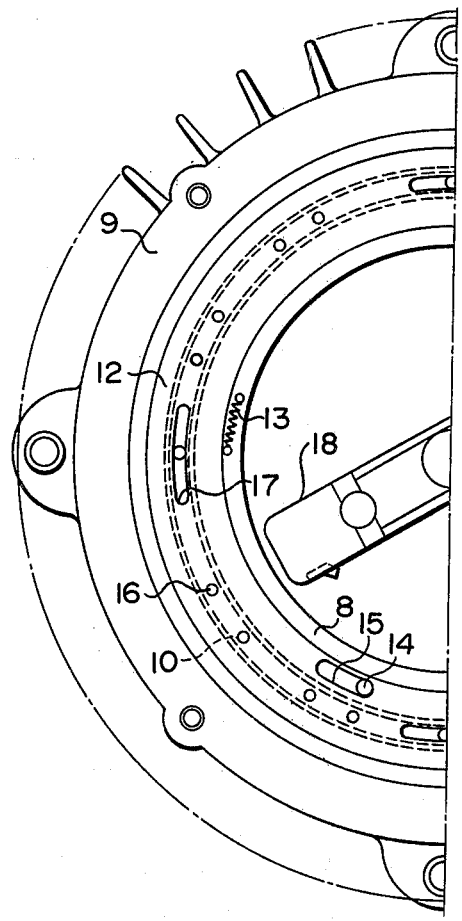
FIG. 3
FIG. 4

FLUID COUPLING FOR AN INTERNAL COMBUSTION ENGINE

BACKGROUND OF THE INVENTION

This invention relates to a coupling assembly for an internal combustion engine and, more particularly, to an assembly for affecting a fluid coupling between the output shaft of the engine and a cooling fan for the engine.

Cooling fans have long been used for cooling internal combustion engines. In some arrangements of this type, the cooling fan is driven by a pulley or the like which is directly connected to the main output shaft of the engine. As a result, the angular velocity of the fan increases in direct proportion to the increase in engine speed. Since the intensity of sound produced by the fan is in proportion to the sixth power of its velocity, it can be appreciated that the noise generated by the fan can reach very loud levels with corresponding increases in the engine speed.

It has been suggested to employ a fluid coupling between the engine output shaft and the fan in order to suppress the proportional increases in the fan velocity after a predetermined engine speed has been achieved in order to minimize the noise generated by the fan. However, in these arrangements, the fan velocity and resultant noise are reduced only during normal operation of the engine and are not reduced if the engine rotation is rapidly accelerated.

SUMMARY OF THE INVENTION

It is, therefore, an object of the present invention to provide a coupling assembly between an engine output shaft and its cooling fan in which the fan velocity, and therefore its resultant noise, is minimized both in the normal operation of the engine and when the engine is rapidly accelerated.

It is a further object of the present invention to provide a coupling assembly of the above type in which the velocity of the cooling fan does not increase over a certain value even though the engine output torque is abruptly accelerated.

It is a more specific object of the present invention to provide a coupling assembly of the above type which converts the rotating torque of a rotor fixed to the output shaft of the engine into a rotational torque of an output casing to which a cooling fan is attached.

Toward the fulfillment of these and other objects, the coupling assembly of the present invention comprises a rotor fixed to the output shaft of an internal combustion engine, a first casing fixed to the cooling fan, surrounding said rotor and defining a first reservoir, a coupling fluid disposed in said reservoir for transferring the torque of said rotor to said casing, a second casing fixed to said first casing and defining a second reservoir for said fluid, said second casing having a plurality of openings formed therethrough for permitting said fluid to pass from said first reservoir to said second reservoir to reduce the amount of torque transferred from said rotor to said casing, and means responsive to an accelerated rotation of said rotor for selectively controlling the amount of fluid passing through said openings and thus controlling the amount of said torque transferred.

BRIEF DESCRIPTION OF THE DRAWINGS

FIG. 3 is a vertical cross-sectional view depicting the fluid coupling assembly of the present invention;

FIG. 4 is a partial cross-sectional view taken along the line a—a of FIG. 3.

DESCRIPTION OF THE PREFERRED EMBODIMENTS

Figure 1:
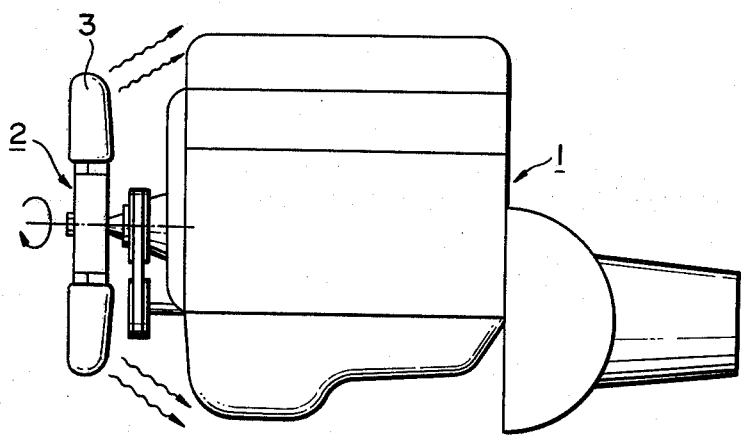
FIG. 1 is a schematic representation of an internal combustion engine connected to a cooling fan by the coupling assembly of the present invention.

Referring specifically to FIG. 1, the reference numeral 1 refers to general to an internal combustion engine, and the reference numeral 2 to the coupling assembly of the present invention which connects the output shaft of the engine to a cooling fan 3.

Figure 2:
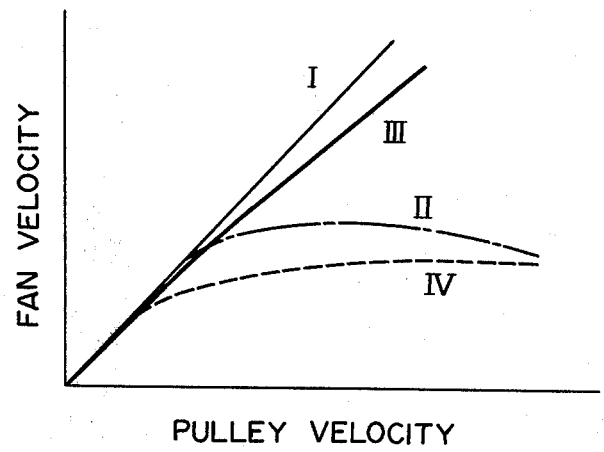
FIG. 2 is a diagram showing comparative characteristic curves of a conventional coupling assembly of the above type when compared to the coupling assembly of the present invention.

In order to appreciate the features of the present invention, reference is made to FIG. 2 which depicts the operational curves achieved according to the coupling assembly of the present invention when compared to those of the prior art. In particular, the horizontal axis depicts the pulley velocity, or the angular velocity of the engine output shaft, while the vertical axis depicts the angular velocity of the fan. The curve designated by the reference numeral I refers to a prior art arrangement in which the pulley is directly connected to the shaft of the cooling fan, with the pulley velocity and the fan velocity thus increasing to direct proportion, resulting in a straight line curve.

Curve II refers to an arrangement in which a conventional fluid coupling is provided between the pulley and the shaft of the cooling fan, in which the cooling fan velocity does not increase over a predetermined velocity even though the pulley velocity continues increasing during normal operation of the engine. However, the arrangement depicted by curve II changes when the engine rotation is accelerated rapidly, resulting in the curve shown by the reference numeral III. In this curve, the reduction of the fan velocity over a certain velocity in response to increases in pulley velocity is not effective when the engine rotation is rapidly accelerated, since it is apparent from the latter curve that the fan velocity increases substantially proportionally to the pulley velocity under these conditions.

The reference numeral IV refers to the characteristic curve achieved according to the present invention which is similar to the curve II obtained for a conventional fluid coupling in a normal operation of the engine. In particular, according to the arrangement of the present invention, the fan velocity does not increase over a certain velocity despite continuous increases in pulley velocity even when the pulley velocity, or engine rotation, is rapidly accelerated.

The structural details of the coupling assembly of the present invention are shown in FIG. 3. In particular, a rotor 4 is directly connected to the output shaft of an engine and is adapted to drive a casing 5 which is rotatably mounted relative to the output shaft. To this end, the torque generated by the rotor 4 is converted into a torque for the casing 5 through a fluid, such as oil, which is stored and treated in a manner to be described in detail later.

The casing 5 is fixed to an additional casing 6 and a fan shaft 7 is secured in both of the casings 5 and 6. A third casing 9 is directly connected to the casing 6 via a plurality of bolts in a conventional manner.

The coupling fluid is disposed in a reservoir defined between the casings 5 and 6. A plurality of holes 10 extend through the casing 6 and communicate with a reservoir 11 defined between the casing 6 and the casing 9 to permit the flow of oil from the reservoir defined between the casings 5 and 6 to the reservoir 11.

Figure 5:
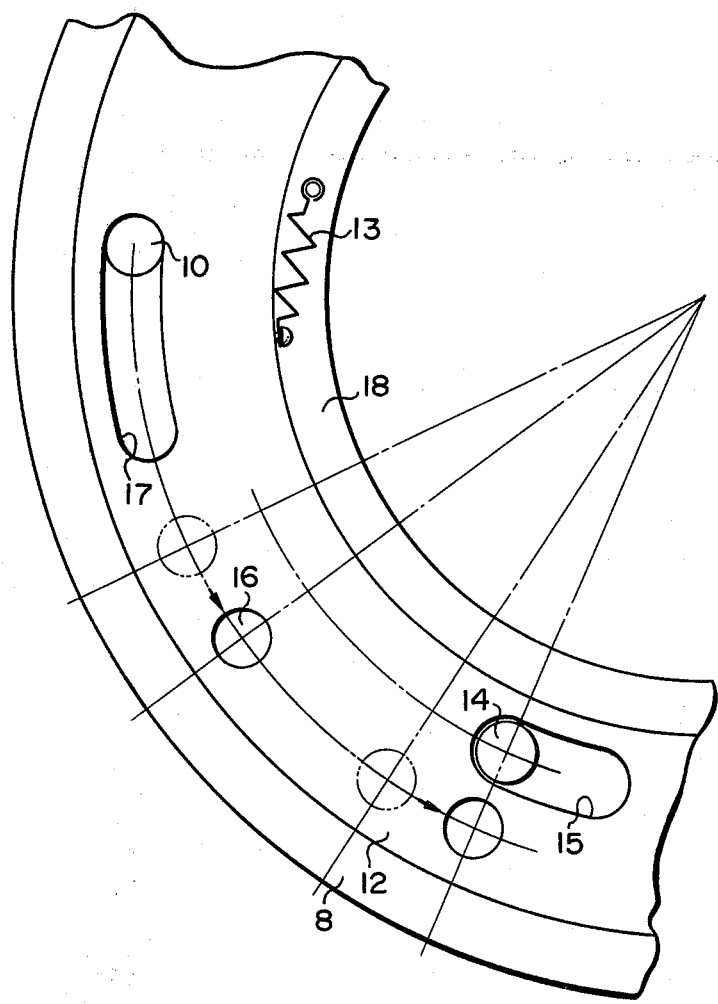
FIG. 5 is an enlarged partial view of the assembly of FIG. 4.

As better shown in FIGS. 4 and 5, an inertia valve 12 is disposed in the reservoir 11 and is connected to the casing 6 by a spring 13. A slot 15 is provided in the valve 12 which is slidably engaged by a pin 14 fixed to the casing 6. This, together with the spring 13, permits a limited rotational movement of the valve 12 relative to the casing 6. The valve 12 is substantially annular in shape, and has a plurality of spaced holes 16 and slots 17 extending therethrough. The design is such that the holes 16 and the slots 17 are adapted to fall in and out of alignment with the oil holes 10 in the following manner.

In the normal operation of the engine, the valve 12 is positioned relative to the casing 9 as shown in FIG. 5, with the holes 16 in the valve 12 out of alignment with the oil holes 10 and with the slots 17 in alignment with the oil holes. As a result, upon rotation of the engine output shaft fluid passes from the reservoir between the casings 5 and 6 to the reservoir 11 only through the slots 17. As a result of this relatively small movement of fluid between the two reservoirs, the quantity of fluid remaining in the reservoir between the casings 5 and 6 is relatively large, which results in the relatively large transmittal of torque from the rotor 4 to the assembly formed by the casings 5 and 6. Thus, the rotation of the casings 5 and 6 and therefore the fan speed increases with increases in the speed of the engine output shaft.

However, when the engine rotation is accelerated, the design is such that the valve 12 moves relative to the assembly in response to the angular acceleration, causing the slot 15 in the valve 12 to move relative to the pin 14. If this angular acceleration is sufficient to move the valve 12 relative to the casing 6 to the extent that the pin 14 reaches the end of the slot, the holes 16 in the valve align with the oil holes 10, and the latter holes also align with a different portion of the elongated slots 17 in the valve. In this position, the quantity of oil passing into the reservoir 11 is considerably increased, which reduces the amount of fluid in the reservoir between the casings 5 and 6, and therefore reduces the torque transmitted between the rotor 4 and the assembly formed by the casings 5 and 6. As a result, the speed of the casings 5 and 6 will not increase over the predetermined amount set by the movement of the valve 12, despite the angular acceleration of the engine output shaft. Thus, the velocity of the fan attached to the casings 5 and 6 and the resultant noise is reduced when compared to that of the prior art arrangements.

In is noted that the inertia valve 12 of the coupling assembly of the present invention is designed to operate independently of any type of thermostat or the like used in connection with the coupling fluid. To this end, a bimetallic member 19 is mounted on the casing 9 and is adapted to sense temperature and rotate a thermal valve 18 which opens and closes an additional opening formed through a divider 20 communicating with the fluid reservoir 11. In particular, the bimetallic member 19 and the thermal valve 18 are connected to a rod 22 rotatably mounted in the casing 9. The bimetallic member 19 is in a spiral form, with one end being fixed on a stay 23 attached to the casing 9 and the other end being connected to the rod 22. As temperature rises, the bimetallic member 19 extends thus forcing the rod 22 to rotate. As a result, the thermal valve 18 is also rotated to expose an opening 21 provided through the divider 20 through which oil may circulate back from the reservoir 11 to the reservoir between the casings 5 and 6. If the temperature of the bimetallic member 19 is relatively low, the opening 21 remains closed by the valve 18, thus maintaining the oil within the reservoir 11.

It is understood that several variations may be made in the foregoing without departing from the scope of the invention. For example, other devices normally associated with an internal combustion engine may be driven by the coupling assembly of the present invention.

Still other variations may be made in the foregoing without departing from the scope of the invention as defined by the appended claims.

We claim:

1. A coupling assembly comprising a rotor adapted for connection to a driving member, a first casing adapted for connection to a member to be driven, said first casing surrounding said rotor and cooperating with said rotor to define a first reservoir, a coupling fluid disposed in said first reservoir for transferring the torque of said rotor to said casing, a second casing fixed to said first casing and cooperating with said first casing for defining a second reservoir for said fluid, a plurality of openings extending through said first casing and communicating said reservoirs for permitting said fluid to pass from said first reservoir to said second reservoir to reduce the amount of torque transferred from said rotor to said first casing, and an inertia valve means connected relative to one of said casings and adapted to move relative to said openings in response to angular acceleration of said rotor for selectively controlling the amount of fluid passing from said first reservoir to said second reservoir and thus controlling the amount of said torque transferred, said valve means being adapted to attain a normal position relative to said first casing in which it blocks at least a portion of said openings, said valve having a plurality of openings extending therethrough and being adapted to move to another position in which its openings register with said openings in said first casing to permit said fluid to pass through said openings.

2. The assembly of claim 1 further comprising a spring connecting said inertia valve to said second casing.

3. A coupling assembly comprising a rotor adapted for connection to a driving member, a first casing adapted for connection to a member to be driven, said first casing surrounding said rotor and cooperating with said rotor to define a first reservoir, a coupling fluid disposed in said first reservoir for transferring the torque of said rotor to said casing, a second casing fixed to said first casing and cooperating with said first casing for defining a second reservoir for said fluid, a plurality of openings extending through said first casing and communicating said reservoirs for permitting said fluid to pass from said first reservoir to said second reservoir to reduce the amount of torque transferred from said rotor to said first casing, and an annular shaped inertia valve means disposed in a coaxial relationship to said rotor, said valve means being connected relative to one of said casings and adapted to rotate relative to said openings in response to angular acceleration of said rotor for selectively controlling the amount of fluid passing from said first reservoir to said second reservoir and thus controlling the amount of said torque transferred.

4. The assembly of claim 3 further comprising a spring connecting said inertia valve means to said casing.

* * * * *

UNITED STATES PATENT OFFICE
CERTIFICATE OF CORRECTION

Patent No. 3,943,893              Dated March 16, 1976

Inventor(s) YOUSUKE TSUBAKI et al

It is certified that error appears in the above-identified patent and that said Letters Patent are hereby corrected as shown below:

Column 2, line 36, change "to" to -- in --

Column 3, line 61, change "In" to -- It --

Column 4, line 48, after "valve" insert -- means --

Column 6, line 5, after "said" (second occurrence) insert -- second --

Signed and Sealed this twenty-second Day of June 1976

[SEAL]

Attest:

RUTH C. MASON
Attesting Officer

C. MARSHALL DANN
Commissioner of Patents and Trademarks